United States Patent
Cheng et al.

(10) Patent No.: US 6,296,471 B1
(45) Date of Patent: *Oct. 2, 2001

(54) MOLD USED TO FORM A FOOTED CONTAINER AND BASE THEREFOR

(75) Inventors: Jizu J. Cheng, Burr Ridge; Jeffrey D. Krich, Orland Park, both of IL (US)

(73) Assignee: Crown Cork & Seal Technologies Corporation, Alsip, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,539

(22) Filed: Aug. 25, 1998

(51) Int. Cl.⁷ .............................. B29C 33/42; B29C 49/48

(52) U.S. Cl. .......................... 425/522; 249/117; 425/525

(58) Field of Search ................................... 425/470, 522, 425/525; 249/117

(56) References Cited

U.S. PATENT DOCUMENTS

| | | |
|---|---|---|
| D. 327,845 | 7/1992 | Behm et al. . |
| D. 330,330 | 10/1992 | Behm et al. . |
| D. 358,547 | 5/1995 | Darr ....................................... D9/520 |
| 3,511,401 | 5/1970 | Lachner . |
| 3,598,270 | 8/1971 | Adomaitis et al. . |
| 3,722,726 | 3/1973 | Carmichael et al. . |
| 3,871,541 | 3/1975 | Adomaitis . |
| 3,881,621 | 5/1975 | Adomaitis . |
| 3,927,782 | 12/1975 | Edwards . |
| 3,935,955 | 2/1976 | Das . |
| 4,108,324 | 8/1978 | Krishnakumar et al. . |
| 4,231,483 | 11/1980 | Dechenne et al. . |

(List continued on next page.)

FOREIGN PATENT DOCUMENTS

| | | |
|---|---|---|
| 0 219 696 | 4/1987 | (EP) . |
| 0 225 155 | 6/1987 | (EP) . |
| 0 385 693 | 9/1990 | (EP) . |
| WO 86/05462 | 9/1986 | (WO) . |
| WO 88/05747 | 8/1988 | (WO) . |
| WO 92/00880 | 1/1992 | (WO) . |

OTHER PUBLICATIONS

Research Disclosure #19122, Mar. 1980, No. 191, pp. 113 and 114 (and Abstract).
Research Disclosure #35272, Aug. 1993 pp. 566 and 567 (and Abstract).

*Primary Examiner*—Robert Davis
(74) *Attorney, Agent, or Firm*—Woodcock Washburn Kurtz Mackiewicz & Norris LLP

(57) ABSTRACT

A mold assembly for making a polymeric container that is shaped to exhibit superior characteristics of light weighting, stability against toppling and resistance to stress cracking includes a conventional cylindrical body portion having a longitudinal axis and a circumferential sidewall and a novel bottom portion. The bottom portion includes a central pushup area of uniformity that is substantially uniform within a spatial rotation about the longitudinal axis. The area of uniformity has a radius $R_G$. The bottom also includes a plurality of support feet that surround and protrude downwardly from the pushup area. Each of the support feet have a bottom support surface with an inner point of contact and an outer point of contact. The outer points of contact together define an outer contact radius $R_{OC}$. The bottom portion as a whole has a radius of maximum width $R_{BASE}$. A plurality of ribs are positioned in valleys between the support feet. Each of these ribs is positioned between and helps define two of the support feet. At least one of the ribs has a localized radius of curvature $R_C$ that intersects an arc connecting inner points of contact of two adjacent support feet. Advantageously, the radius of uniformity is within the range of about 16% to about 26% of $R_{OC}$; and $R_C$ is within the range of about 70% to about 10% of $R_{BASE}$.

13 Claims, 5 Drawing Sheets

U.S. PATENT DOCUMENTS

| | | |
|---|---|---|
| 4,247,012 | 1/1981 | Alberghini . |
| 4,249,666 | 2/1981 | Hubert et al. . |
| 4,249,667 | 2/1981 | Pocock et al. . |
| 4,254,882 | 3/1981 | Yoshino . |
| 4,267,144 | 5/1981 | Collette et al. ................. 264/523 |
| 4,276,987 | 7/1981 | Michel . |
| 4,294,366 | 10/1981 | Chang . |
| 4,318,489 | 3/1982 | Snyder et al. . |
| 4,335,821 | 6/1982 | Collette et al. . |
| 4,342,398 | 8/1982 | Chang . |
| 4,368,825 | 1/1983 | Motill . |
| 4,700,837 | 10/1987 | Hammett . |
| 4,785,949 | 11/1988 | Krishnakumar et al. . |
| 4,850,493 | 7/1989 | Howard, Jr. . |
| 4,850,494 | 7/1989 | Howard, Jr. . |
| 4,865,206 | 9/1989 | Behm et al. . |
| 4,867,323 | 9/1989 | Powers . |
| 4,978,015 | 12/1990 | Walker . |
| 5,024,339 | 6/1991 | Riemer . |
| 5,024,340 | 6/1991 | Alberghini et al. . |
| 5,064,080 | 11/1991 | Young et al. . |
| 5,072,841 | 12/1991 | Okhai . |
| 5,139,162 | 8/1992 | Young et al. . |
| 5,198,248 * | 3/1993 | Krishnakumar et al. ............ 425/522 |
| 5,261,543 | 11/1993 | Ugarelli . |
| 5,287,987 | 2/1994 | Young et al. . |
| 5,375,729 | 12/1994 | Schubert . |
| 5,427,258 | 6/1995 | Krishnakumar et al. ............ 264/523 |
| 5,458,825 | 10/1995 | Grolman et al. .................. 264/523 |
| 5,484,072 | 1/1996 | Beck et al. ....................... 264/523 |
| 5,507,402 | 4/1996 | Clark . |
| 5,529,196 | 6/1996 | Lane ................................ 215/375 |
| 5,549,210 | 8/1996 | Cheng .............................. 215/375 |
| 5,603,423 | 2/1997 | Lynn et al. . |
| 5,664,695 | 9/1997 | Young et al. . |
| 5,713,480 * | 2/1998 | Petre et al. ...................... 425/525 |

* cited by examiner

MOLD USED TO FORM A FOOTED CONTAINER AND BASE THEREFOR

BACKGROUND OF THE INVENTION

1. Field of the Invention

This invention relates broadly to the field of container making, and more specifically to blow molded plastic bottles, such as the PET bottles that are in common use today for packaging soft drinks such as soda. More specifically, the invention relates to an improved footed container and bottom therefor that exhibits superior characteristics of light weighting, stability and resistance to stress cracking.

2. Description of the Related Technology

During the last twenty-five years or so, there has been a dramatic shift in the packaging of carbonated beverages, particularly, soft drinks, away from glass containers and toward plastic containers. The plastic containers initially took the form of a two-piece construction, wherein a plastic bottle having a generally hemispherical bottom was applied a separate base cup, which would permit the bottle to be stood upright. The hemispherical bottom was seen as the most desirable shape for retaining the pressure generated by the carbonation within the container. Pressures in such containers can rise to 100 p.s.i. or more when the bottled beverage is exposed to the sun, stored in a warm room, car trunk, or the like.

Such plastic containers represented a significant safety advantage over glass containers when exposed to the same internal pressures. However, the two-piece construction was not economical because it required a post molding assembly step, and, also a separation step prior to reclaiming or recycling the resins forming the bottle and base cup.

During this period of development, various attempts were made to construct a one-piece, self-supporting container that would be able to retain the carbonated beverages at the pressures involved. Such a one-piece container requires the design of a base structure which will support the bottle in an upright position and will not bulge outwardly at the bottom. A variety of designs were first attempted, with most following one of two principal lines of thought. One line of designs involved a so-called champagne base having a complete annular peripheral ring. Examples of such bottles are found in U.S. Pat. Nos. 3,722,726; 3,881,621; 4,108,324; 4,247,012; and, 4,249,666. Another variety of designs is that which included a plurality of feet protruding downward from a curved bottom. Examples of this variety are to be found in U.S. Pat. Nos. 3,598,270, 4,294,366; 4,368,825; 4,865,206; and, 4,867,323. In recent years, the latter type of design has achieved primacy in the marketplace.

Footed one piece bottles present certain problems, though, that have not yet been worked out to the satisfaction of the packaging industry and its customers. For example, the uneven orientation of the polymer in the footed area of the bottom can contribute to uneven post-filling expansion of either one or more feet or the central portion of the bottom, creating what is generally referred to as a "rocker." In addition, the presence of the feet themselves and the need to force the oriented material into the shape of the feet can create stress points in the container bottom that can adversely affect container shape. Container bottom designs that minimize stress and disorientation of the polymer during molding, then are considered preferable.

Another concern in the design of container bottoms for one piece containers is the possibility of stress cracking in the base. The amount of stress cracking is related to the geometry of the base. Relatively large radius curves in the base will reduce the potential for stress cracking compared to a base with small radius curves.

Yet another factor that is important in the design of such containers is that of positional stability after filling and pressurization of the container. It is preferable, from both a bottler's and consumer's standpoint, for a filled container to be as resistant to toppling as possible. The stability of a filled container is closely related to the radius of its "outside standing ring," i.e. the distance that the bottom contact surfaces of the feet extend from the center axis of the container.

A further factor that must be taken into account in the design of footed container bottoms is that of efficient distribution of material within the article, so that the article is as "light weighted" as possible given the necessary strength, volumetric and stability requirements of the container. Light weighting is in particular important economically for the manufacturer of the container, since it directly impacts material costs.

A need exists for an improved bottom design for a polymeric one piece container and a mold assembly for making such a container that will optimize use of material relative to strength, reduce the possibility of stress cracking, permit molding with a minimum of stress and disorientation of the polymer material, and exhibit superior resistance against toppling.

SUMMARY OF THE INVENTION

Accordingly, it is an object of the invention to provide an improved bottom design for a polymeric one piece container and a mold assembly for making such a container that will optimize use of material relative to strength, reduce the possibility of stress cracking, permit molding with a minimum of stress and disorientation of the polymer material, and exhibit superior resistance against toppling.

In order to achieve the above and other objects of the invention, a molded polymeric container according to one aspect of the invention is shaped to exhibit superior characteristics of light weighting, stability against toppling and resistance to stress cracking. It includes a first mold surface defining a conventional cylindrical body portion having a longitudinal axis and a circumferential sidewall and a second mold surface defining a novel bottom portion. The bottom portion includes a central pushup area of uniformity that is substantially uniform within a spatial rotation about the longitudinal axis. The area of uniformity has a radius $R_G$. The bottom also includes a plurality of support feet that surround and protrude downwardly from the pushup area. Each of the support feet have a bottom support surface with an inner point of contact and an outer point of contact. The outer points of contact together define an outer contact radius $R_{OC}$. The bottom portion as a whole has a radius of maximum width $R_{BASE}$. A plurality of ribs are positioned in valleys between the support feet. Each of these ribs is positioned between and helps define two of the support feet. At least one of the ribs has a localized radius of curvature $R_C$ that intersects a line connecting inner points of contact of two adjacent support feet. Advantageously, the radius of uniformity is within the range of about 16% to about 26% of $R_{OC}$; and $R_C$ is within the range of about 70% to about 10% of $R_{BASE}$.

According to a second aspect of the invention, a molded polymeric container that is shaped to exhibit superior characteristics of light weighting, stability against toppling and resistance to stress cracking includes a first mold surface defining a substantially cylindrical body portion having a longitudinal axis and a circumferential sidewall; and a second mold surface defining a bottom portion that includes a central pushup area; a plurality of support feet surrounding and protruding downwardly from the pushup area, each of the support feet having a bottom support surface with an inner point of contact and an outer point of contact, the outer points of contacting together defining an outer contact radius $R_{OC}$; and wherein the bottom portion further has a dimension $h_{OC}$ that is defined as the height of the rib directly above the circle that is defined by the outer contact radius $R_{OC}$, and wherein $$h_{OC} = \frac{\Pi \cdot Rbase \cdot \operatorname{Sin}\beta}{n \cdot (1 - \operatorname{Cos}\beta)} \cdot \left(A - \frac{Roc}{Rbase}\right)$$

where n=the number of feet in the bottom; and
A=a ring index, and wherein A is within a range of about 0.9 to about 1.15.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
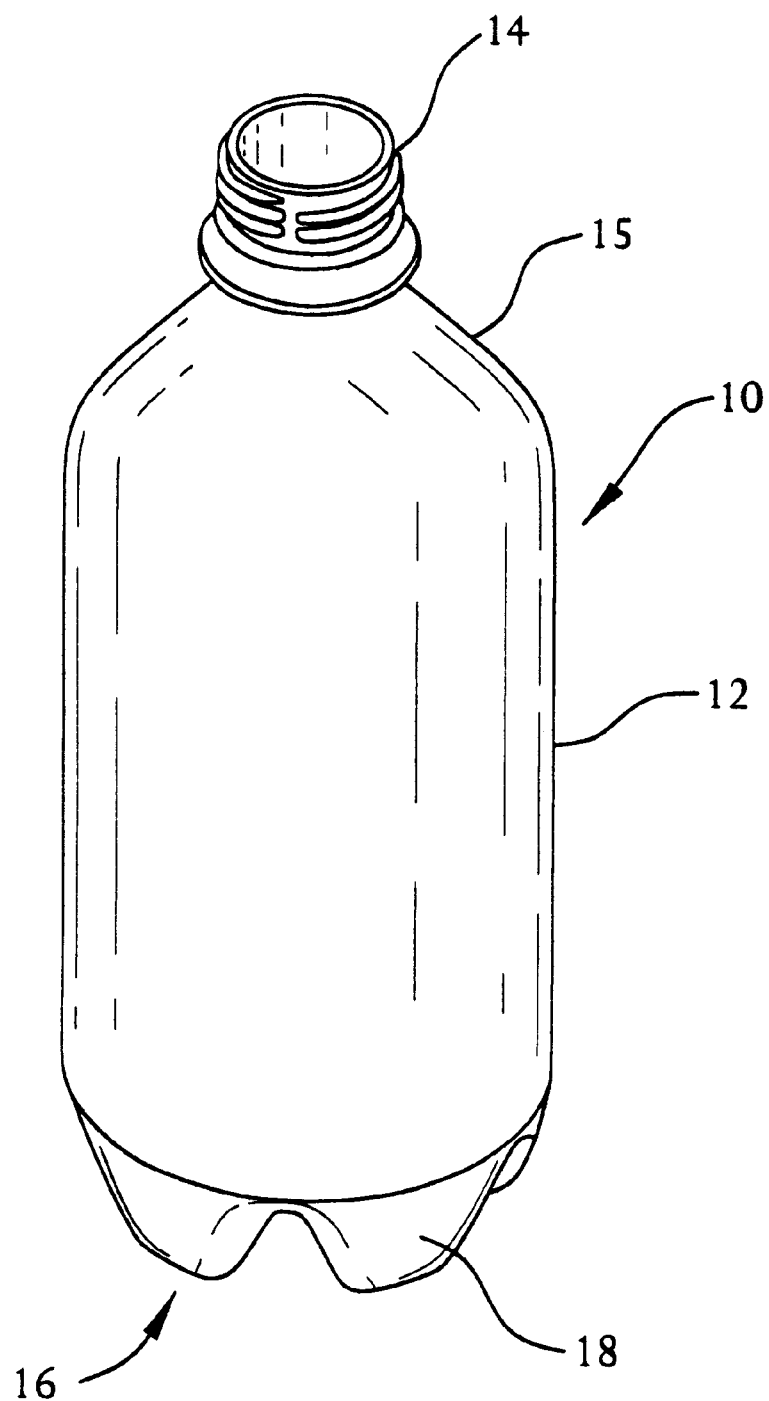
FIG. 1 is a perspective view of a container that is constructed according to a preferred embodiment of the invention.
Figure 2:
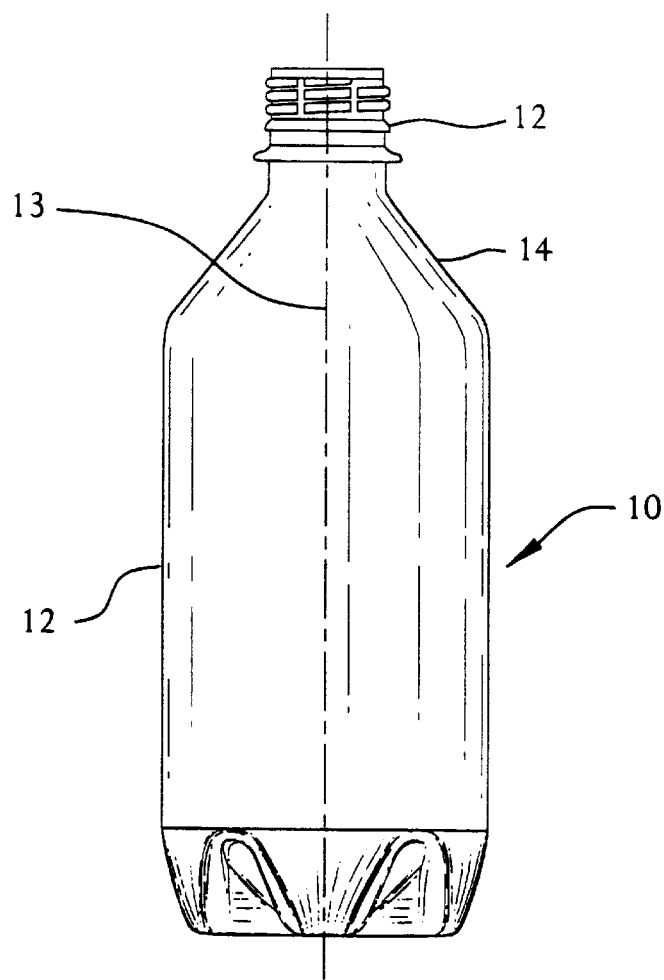
FIG. 2 is a side elevational view of the container shown in FIG. 1.
Figure 3:
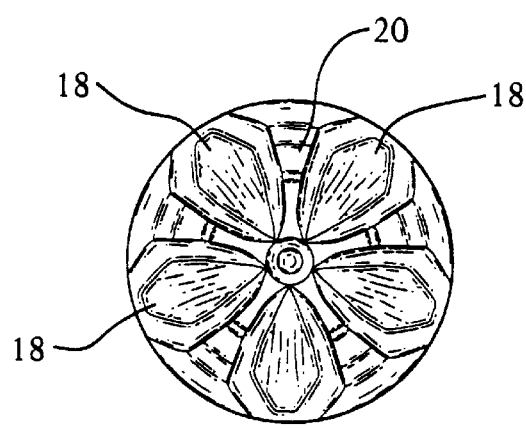
FIG. 3 is a bottom plan view of the container shown in FIGS. 1 and 2.

Referring now to the drawings, wherein like reference numerals designate corresponding structure throughout the views, and referring in particular to FIG. 1, a molded polymeric container 10 that is shaped to exhibit superior characteristics of light weighting, stability against toppling and resistance to stress cracking includes a conventional cylindrical body portion 12 having a longitudinal axis 13, shown in FIG. 2. As is conventional, container 10 includes a threaded finish portion 14, a tapered neck portion 15 connecting the body portion 12 to the finish portion 14, and a novel and advantageous bottom portion 16.

Figure 4:
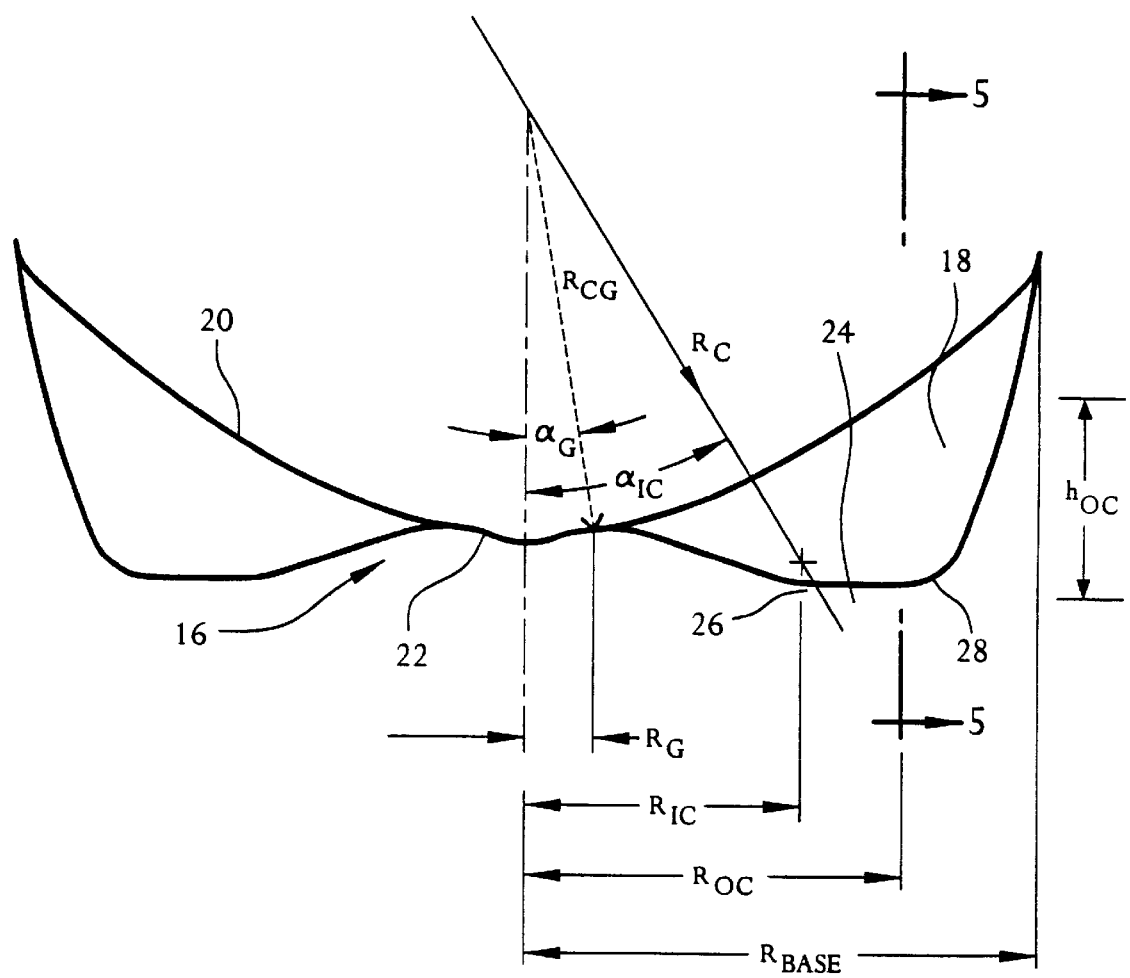
FIG. 4 is a diagrammatical depiction of certain features of the invention as it is embodied in the Figures described above.

In the preferred embodiment, bottom portion 16 includes a central pushup area 22 of uniformity that is substantially uniform within a spatial rotation about the longitudinal axis 13. The area of uniformity has a radius $R_G$, as is shown in FIG. 4. One of the principles of the invention is to maximize this relative size of this area 22, which has the effect of promoting light weighting of the container 10. Bottom portion 16 also includes a plurality of support feet 18 that surround and protrude downwardly from the pushup area 22. Each of the support feet 18 have a bottom support surface 24 with an inner point of contact 26 and an outer point of contact 28. The outer points of contact 28 together define an outer contact radius $R_{OC}$, also known as the outside standing ring of the base. The bottom portion 16 as a whole has a radius of maximum width $R_{BASE}$. The larger the outside standing ring, the greater the stability of the container is against tipping. In the preferred embodiment, the outside standing $R_{OC}$ is within the range of about 72% to about 75% of $R_{BASE}$.

A plurality of ribs 20 are positioned in valleys between the support feet 18. Each of these ribs 20 is positioned between and helps define two of the support feet 18. The ribs 20 are preferably of varying radii of curvature along their length, from near the pushup area 22 to where they taper into the sidewall 12 of the container. At least one of the ribs 20 has a localized radius of curvature $R_C$ at a point where it intersects an arc, with its points equidistant from the axis 13, connecting inner points 26 of contact of two adjacent support feet 18. Advantageously, the radius of uniformity is within the range of about 16% to about 26% of $R_{OC}$; and $R_C$ is within the range of about 70% to about 10% of $R_{BASE}$. More preferably, the radius of uniformity is within the range of about 18% to about 24% of $R_{OC}$; and $R_C$ is within the range of about 85% to about 100% of $R_{BASE}$. Also within the ambit of the invention are ranges of the ratio of the radius of uniformity $R_G$ to $R_{OC}$ having lower values of any value between 16 and 20, and upper values of any value between 22 to 26. Further within the ambit of the invention are ratios of $R_C$ to $R_{BASE}$ within a range that is any combination of a values 70% to 130%.

As may further be seen in FIG. 4, the localized radius of curvature $R_C$ defines an angle $\alpha_{IC}$ with respect to the longitudinal axis 13. The rib 20 has a second localized radius of curvature $R_{CG}$ at the point where it intersects the outer boundary of the area of uniformity 22. The radius of curvature $R_{CG}$ defines an angle $\alpha_G$ with respect to the axis 13, as may be seen in FIG. 4.

Advantageously, an angle that is visible in FIG. 4 and is defined as $\alpha_{IC}$ minus $\alpha_G$ is within a range of about 16° to about 30°, or, more preferably, within a range of about 18° to about 22°. Ranges with lower end values of between 16° and 18°, and higher end values of between 18° and 22° are also within the ambit of the invention.

Figure 5:
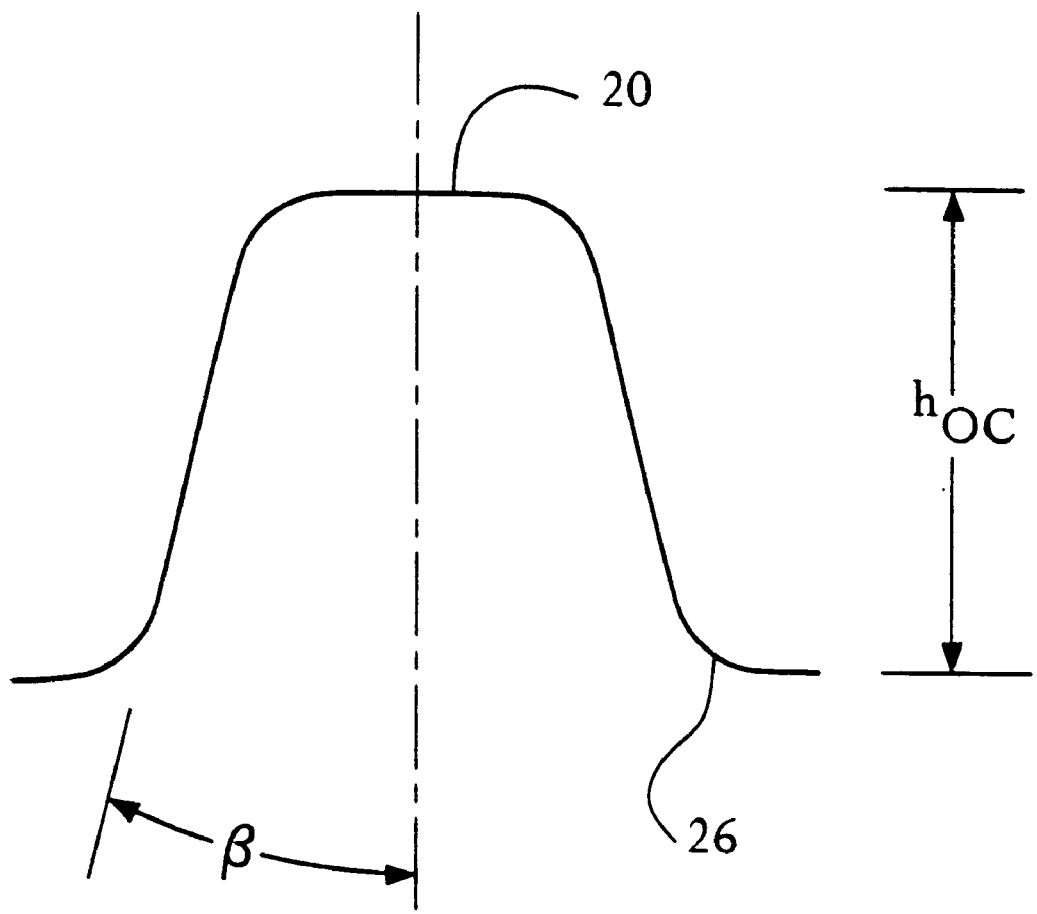
FIG. 5 is a cross-section taken along lines 5—5 in FIG. 4.

Referring now to FIGS. 4 and 5, it will be seen that the bottom portion 16 further has a dimension $h_{OC}$ that is defined as the height of the rib directly above the circle that is defined by the outer contact radius $R_{OC}$. This dimension $h_{OC}$ is highly relevant to the control of optimal hoop stretch of the container bottom during formation so that is matches as closely as possible the stretch of the major diameter section of the container. As may be seen in FIG. 5, which is a cross-section taken along lines 5—5 in FIG. 4, the side walls of the feet form angles β with respect to the axis of the instant radius of the rib 20 at the point where the vertical projection of the radius $R_{OC}$ intersects the rib 20.

Optimally, according to one aspect of the invention it has been determined that $$h_{OC} = \frac{\Pi \cdot Rbase \cdot \text{Sin}\beta}{n \cdot (1 - \text{Cos}\beta)} \cdot \left(A - \frac{Roc}{Rbase}\right)$$

where n=the number of in the bottom; and A=a ring index, and wherein A is within a range of about 0.9 to about 1.15. More preferably, ring index A is within the range of about 0.95 to about 1.05.

Figure 6:
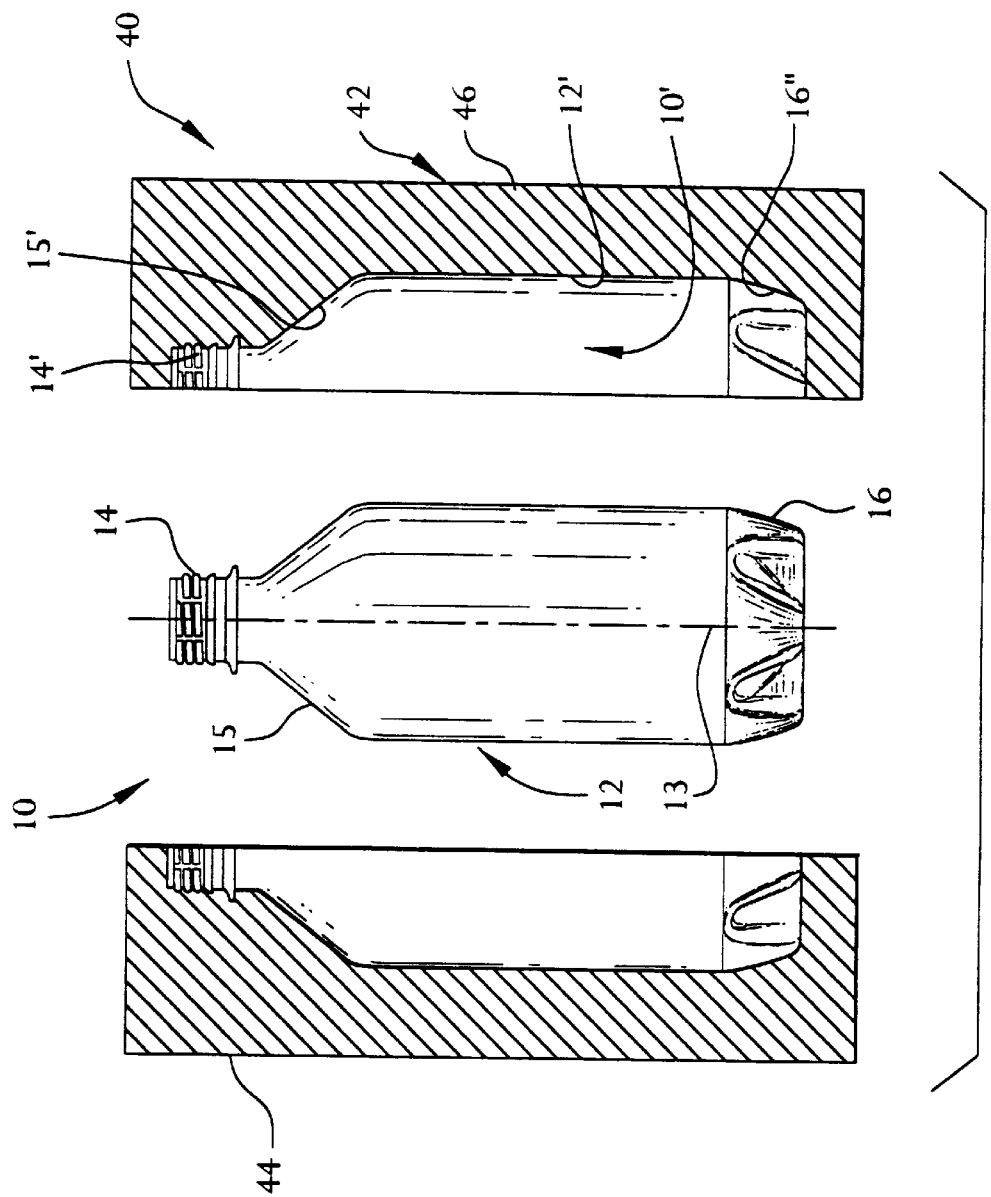
FIG. 6 is a diagrammatical depiction of a system and a process for making the container that is shown in FIGS. 1–5.

FIG. 6 depicts a system 40 for making the container 10 that is depicted in FIGS. 1–5, and also diagrammatically depicts the process that is preferably used for making a container 10. As may be seen in FIG. 6, system 40 includes a mold 42 that includes a first mold half 44 and a second mold half 46. The mold halves 44, 46 are shaped so as to have inside surfaces that complement the intended final shape of the container 10. For example, each of those mold halves 44, 46 includes a surface 12' that is complementary to the container side wall 12 and has a portion 14' that is complementary to threaded finish portion 14, a portion 15' that is complementary to the tapered neck portion 15 that connects the body portion 12 to the finish portion 14, and a portion 16' that is complementary to bottom portion 16.

Mold halves 44, 46 are blown according to known techniques from a parison that, prior to placement within the mold 42 is thermally conditioned to a temperature that is within the range for molecular orientation. The parison is then, as is conventional, stretched by an axially movable blow pin. This initial axial stretching of the material establishes molecular alignment and initiates strain-induced crystallization in the material, which is preferably polyethylene terephthalate (PET). A blow fluid is then introduced into the parison under pressure, which forces the material to conform to the inner surfaces of the mold halves 44, 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A mold assembly for making a polymeric container that is shaped to exhibit superior characteristics of light weighting, stability against toppling and resistance to stress cracking, comprising:
    a first mold surface defining a substantially cylindrical body portion having a longitudinal axis and a circumferential sidewall; and
    a second mold surface defining a bottom portion comprising:
        a central pushup area of uniformity that is substantially uniform within a spatial rotation about the longitudinal axis, said area of uniformity having a radius $R_G$;
        a plurality of support feet surrounding and protruding downwardly from the pushup area, each of the support feet having a bottom support surface with an inner point of contact and an outer point of contact, said outer points of contacting together defining an outer contact radius $R_{OC}$; said bottom portion further having a radius of maximum width $R_{BASE}$;
        a plurality of ribs positioned in said valleys between said support feet, each of the ribs being positioned between and helping to define two of the support feet, at least one of said ribs having a localized radius of curvature $R_C$ that intersects an arc connecting inner points of contact of two adjacent support feet; and wherein
    said radius of uniformity is within the range of about 16% to about 26% of $R_{OC}$; and $R_C$ is within the range of about 70% to about 110% of $R_{BASE}$.

2. A mold assembly according to claim 1, wherein:
    said radius of curvature $R_C$ defines an angle $\alpha_{IC}$ with respect to said longitudinal axis;
    said at least one rib has a localized radius of curvature $R_{CG}$ that intersects an outer boundary of said area of uniformity, said radius of curvature $R_{CG}$ defining an angle $\alpha_G$ with respect to said longitudinal axis; and
    and $\alpha_{IC}$ minus $\alpha_G$ is within a range of about 16° to about 30°.

3. A mold assembly according to claim 1, wherein said radius of uniformity is within the range of about 18% to about 24% of $R_{OC}$.

4. A mold assembly according to claim 1, wherein $R_C$ is within the range of about 85% to about 100% of $R_{BASE}$.

5. A mold assembly according to claim 2, $\alpha_{IC}$ minus $\alpha_G$ is within a range of about 18° to about 22°.

6. A mold assembly according to claim 1, wherein $R_{OC}$ is at least about 70% of $R_{BASE}$.

7. A mold assembly according to claim 6, wherein $R_{OC}$ is within the range of about 72–75% of $R_{BASE}$.

8. A mold assembly according to claim 1, wherein said rib has a varying radius throughout its length.

9. A mold assembly according to claim 1, wherein said bottom portion further has a dimension $h_{OC}$ that is defined as the height of the rib directly above the circle that is defined by said outer contact radius $R_{OC}$, and wherein $$h_{OC} = \frac{\Pi \cdot Rbase \cdot \text{Sin}\beta}{n \cdot (1 - \text{Cos}\beta)} \cdot \left(A - \frac{Roc}{Rbase}\right)$$

where n=the number of feet in the bottom; and A=a ring index, and wherein A is within a range of about 0.9 to about 1.15.

10. A mold assembly according to claim 9, wherein ring index A is within the range of about 0.95 to about 1.05.

11. A mold assembly for making a polymeric container that is shaped to exhibit superior characteristics of light weighting, stability against toppling and resistance to stress cracking, comprising:
    a first mold surface defining a substantially cylindrical body portion having a longitudinal axis and a circumferential sidewall; and
    a second mold surface defining a bottom portion comprising:
        a central pushup area;
        a plurality of support feet surrounding and protruding downwardly from the pushup area, each of the support feet having a bottom support surface with an inner point of contact and an outer point of contact, said outer points of contacting together defining an outer contact radius $R_{OC}$; and wherein
        said bottom portion further has a dimension $h_{OC}$ that is defined as the height of the rib directly above the circle that is defined by said outer contact radius $R_{OC}$, and wherein $$h_{OC} = \frac{\Pi \cdot Rbase \cdot \operatorname{Sin}\beta}{n \cdot (1 - \operatorname{Cos}\beta)} \cdot \left(A - \frac{Roc}{Rbase}\right)$$

where n=the number of feet in the bottom; and

A=a ring index, and wherein A is within a range of about 0.9 to about 1.15.

12. A mold assembly according to claim 11, wherein said bottom portion further comprises a central pushup area of uniformity that is substantially uniform within a spatial rotation about the longitudinal axis, said area of uniformity having a radius $R_G$ and said radius of uniformity is within the range of about 16% to about 26% of $R_{OC}$.

13. A mold assembly according to claim 11, wherein said bottom portion further includes a plurality of ribs positioned in said valleys between said support feet, each of the ribs being positioned between and helping to define two of the support feet, at least one of said ribs having a localized radius of curvature $R_C$ that intersects an arc connecting inner points of contact of two adjacent support feet; and wherein $R_C$ is within the range of about 70% to about 110% of $R_{BASE}$.

* * * * *

UNITED STATES PATENT AND TRADEMARK OFFICE
CERTIFICATE OF CORRECTION

PATENT NO.   : 6,296,471 B1
DATED        : October 2, 2001
INVENTOR(S)  : Jizu J. Cheng et al.

It is certified that error appears in the above-identified patent and that said Letters Patent is hereby corrected as shown below:

<u>Title page,</u>
Item [22], Filed: delete "Aug. 25, 1998" and insert -- Aug. 26, 1998 -- therefor.
Item [56], References Cited, U.S. PATENT DOCUMENTS, insert the following:

| | | | |
|---|---|---|---|
| -- RE 35,140 | 1/1996 | Powers, Jr. ….. | 215/375 |
| 3,718,229 | 2/1973 | Wyeth et al. ….. | 215/1C |
| 3,757,978 | 9/1973 | Gilbert ….. | 215/1C |
| 3,811,588 | 5/1974 | Vermeerbergen et al. ….. | 215/1C |
| 3,889,835 | 6/1975 | Avant et al. | 220/3 |
| 3,934,743 | 1/1976 | McChesney et al. ….. | 215/1C |
| 3,948,404 | 4/1976 | Collins et al. ….. | 215/1C |
| 3,973,693 | 8/1976 | Brocklehurst ….. | 220/66 |
| 4,174,782 | 11/1979 | Obsomer ….. | 215/1C |
| 4,261,948 | 4/1981 | Krishnakumar et al. ….. | 264/532 |
| 4,301,933 | 11/1981 | Yoshino ….. | 215/1C |
| 4,330,579 | 5/1982 | Ota et al. | |
| 4,334,627 | 6/1982 | Krishnakumar et al. ….. | 215/1C |
| 4,342,895 | 8/1982 | Krishnakumar et al. ….. | 219/10.43 |
| 4,396,816 | 8/1983 | Krishnakumar et al. ….. | 219/10.43 |
| 4,409,161 | 10/1983 | Harry et al. ….. | 264/40.1 |
| 4,437,825 | 3/1984 | Harry et al. ….. | 425/145 |
| 4,465,199 | 8/1984 | Aoki ….. | 215/1C |
| 4,496,064 | 1/1985 | Beck et al. ….. | 215/1C |
| 4,525,401 | 6/1985 | Pocock et al. ….. | 428/64 |
| 4,534,995 | 8/1985 | Pocock et al. ….. | 427/38 |
| 4,576,843 | 3/1986 | Beck et al. | |
| 4,603,831 | 8/1986 | Krishnakumar et al. ….. | 249/144 |
| 4,609,516 | 9/1986 | Krishnakumar et al. ….. | 264/255 |
| 4,618,515 | 10/1986 | Collette et al. | |
| 4,632,053 | 12/1986 | Villanueva et al. …… | 118/66 |
| 4,649,068 | 3/1987 | Collette | |
| 4,665,682 | 5/1987 | Kerins et al . ….. | 53/452 |
| 4,725,464 | 2/1988 | Collette | |
| 4,755,404 | 7/1988 | Collette | |
| 4,759,454 | 7/1988 | Nowicki et al. ….. | 215/12.1 |
| 4,781,954 | 11/1988 | Krishnakumar et al. | |
| 4,863,046 | 9/1989 | Collette et al. ….. | 215/1C |
| 4,889,247 | 12/1989 | Collette et al. …… | 215/1C |
| 4,892,205 | 1/1990 | Powers et al. …….. | 215/1C |
| 4,910,054 | 3/1990 | Collette et al. ….. | 428/35.7 |

UNITED STATES PATENT AND TRADEMARK OFFICE
CERTIFICATE OF CORRECTION

PATENT NO. : 6,296,471 B1
DATED : October 2, 2001
INVENTOR(S) : Jizu J. Cheng et al.

It is certified that error appears in the above-identified patent and that said Letters Patent is hereby corrected as shown below:

U.S. PATENT DOCUMENTS cont'd,

| | | | |
|---|---|---|---|
| 4,923,723 | 5/1990 | Collette et al. …….. | 428/35.7 |
| 4,977,005 | 12/1990 | Krishnakumar et al. ….. | 428/36.92 |
| 4,980,100 | 12/1990 | Krishnakumar et al. ….. | 264/512 |
| 5,133,468 | 7/1992 | Brunson et al. …… | 215/1C |
| 5,160,059 | 11/1992 | Collette et al. ….. | 215/1C |
| 5,454,481 | 10/1995 | Hsu …….. | 220/608 |
| 5,615,790 | 4/1997 | Young et al . ……. | 215/375 |
| 5,685,446 | 11/1997 | Young et al . ……. | 215/375 |

Delete "5,287,987" and insert -- 5,287,978 -- therefor.

FOREIGN PATENT DOCUMENTS, insert
-- 61-144012  9/1986  Japan
   0 739 823  10/1996  EPO
   0 720 905  7/1996  EPO --

Item [57], ABSTRACT,
Line 1, delete "A mold assembly for making a" and insert -- A molded -- therefor.
Line 23, delete "10%" and insert -- 110% -- therefor.

Column 2,
Line 62, delete "to about 10%" and insert -- to about 110% -- therefor.

Column 4,
Line 27, delete "to about 10%" and insert -- to about 110% -- therefor.

UNITED STATES PATENT AND TRADEMARK OFFICE
CERTIFICATE OF CORRECTION

PATENT NO.   : 6,296,471 B1
DATED        : October 2, 2001
INVENTOR(S)  : Jizu J. Cheng et al.

It is certified that error appears in the above-identified patent and that said Letters Patent is hereby corrected as shown below:

Column 5,
Line 5, delete "of in the" and insert -- of feet in the -- therefor.

Signed and Sealed this

Eleventh Day of March, 2003

JAMES E. ROGAN
*Director of the United States Patent and Trademark Office*